(12) United States Patent
Fornoni et al.

(10) Patent No.: US 10,406,775 B2
(45) Date of Patent: Sep. 10, 2019

(54) PERFORATED LAMINATED PRODUCT AND METHOD FOR PRODUCING THIS PRODUCT

(71) Applicant: PANTEX INTERNATIONAL S.P.A., Sulmona (AQ) (IT)

(72) Inventors: Gianluigi Fornoni, Brusaporto (IT); Antonio Caira, Sulmona (IT); Pietro Angeli, Pescara (IT); Carmine Di Benedetto, Sulmona (IT)

(73) Assignee: PANTEX INTERNATIONAL S.P.A., Sulmona (AQ) (IT)

( * ) Notice: Subject to any disclaimer, the term of this patent is extended or adjusted under 35 U.S.C. 154(b) by 247 days.

(21) Appl. No.: 15/031,471

(22) PCT Filed: Oct. 21, 2014

(86) PCT No.: PCT/IB2014/065503
§ 371 (c)(1),
(2) Date: Apr. 22, 2016

(87) PCT Pub. No.: WO2015/059633
PCT Pub. Date: Apr. 30, 2015

(65) Prior Publication Data
US 2016/0257091 A1 Sep. 8, 2016

(30) Foreign Application Priority Data
Oct. 23, 2013 (IT) .................. FI2013A0254

(51) Int. Cl.
*B32B 3/30* (2006.01)
*B32B 5/02* (2006.01)
(Continued)

(52) U.S. Cl.
CPC ............. *B32B 3/30* (2013.01); *B32B 3/266* (2013.01); *B32B 5/022* (2013.01); *B32B 5/24* (2013.01);
(Continued)

(58) Field of Classification Search
CPC ....... B32B 27/12; B32B 27/32; B32B 27/327; B32B 27/36; B32B 3/266; B32B 3/30;
(Continued)

(56) References Cited

U.S. PATENT DOCUMENTS 3,929,135 A * 12/1975 Thompson ............ A61F 13/512
604/385.08
4,518,643 A * 5/1985 Francis ................. B29C 59/022
428/131
(Continued)

FOREIGN PATENT DOCUMENTS

CN      1 943 530 A     4/2007
CN      1943530 A * 4/2007
(Continued)

OTHER PUBLICATIONS

CN-1943530-A Machine Translation.*

*Primary Examiner* — Travis M Figg
(74) *Attorney, Agent, or Firm* — McGlew and Tuttle, P.C.

(57) ABSTRACT

A laminated product comprising an extruded film of microperforated plastic material with a vacuum perforation process having protuberances extending in a same direction from a same face of said film, with first holes having an average diameter between 100 microns and 300 microns, produced at the vertices of said protuberances, and a layer of nonwoven fabric mechanically joined by lamination to said film on the opposite face to that on which said protuberances extend,
(Continued)

said laminated product being perforated with second through holes having an average diameter between 300 microns and 700 microns.

30 Claims, 2 Drawing Sheets

(51) Int. Cl.
| | |
|---|---|
| *B32B 5/24* | (2006.01) |
| *B32B 7/02* | (2019.01) |
| *B32B 7/04* | (2019.01) |
| *B32B 27/12* | (2006.01) |
| *B32B 27/32* | (2006.01) |
| *B32B 27/36* | (2006.01) |
| *B32B 3/26* | (2006.01) |
| *B32B 37/14* | (2006.01) |

(52) U.S. Cl.
CPC .............. *B32B 7/02* (2013.01); *B32B 7/04* (2013.01); *B32B 27/12* (2013.01); *B32B 27/32* (2013.01); *B32B 27/327* (2013.01); *B32B 27/36* (2013.01); *B32B 37/14* (2013.01); *B32B 3/263* (2013.01); *B32B 2555/00* (2013.01)

(58) Field of Classification Search
CPC ........... B32B 37/14; B32B 5/022; B32B 5/24; B32B 7/02; B32B 7/04; B32B 2555/00; B32B 3/263

See application file for complete search history.

(56) References Cited

U.S. PATENT DOCUMENTS

| | | | | |
|---|---|---|---|---|
| 5,698,290 | A  * | 12/1997 | Fukushima | B32B 29/02 |
| | | | | 428/138 |
| 6,420,625 | B1 * | 7/2002 | Jones | A61F 13/5148 |
| | | | | 604/367 |
| 2003/0003269 | A1* | 1/2003 | Lee | A61F 13/15203 |
| | | | | 428/131 |
| 2004/0121120 | A1* | 6/2004 | Gray | A61F 13/15731 |
| | | | | 428/131 |
| 2005/0214506 | A1* | 9/2005 | Lee | A61F 13/15203 |
| | | | | 428/137 |
| 2007/0249253 | A1* | 10/2007 | Angeli | B32B 27/12 |
| | | | | 442/394 |
| 2008/0300562 | A1* | 12/2008 | Ahoniemi | A61F 13/511 |
| | | | | 604/367 |
| 2010/0222759 | A1* | 9/2010 | Hammons | A61F 13/8405 |
| | | | | 604/367 |
| 2011/0100748 | A1* | 5/2011 | Nonogi | B32B 3/266 |
| | | | | 181/291 |
| 2011/0151185 | A1* | 6/2011 | Cree | A61F 13/5121 |
| | | | | 428/138 |
| 2012/0003423 | A1* | 1/2012 | Cree | A61F 13/512 |
| | | | | 428/137 |

FOREIGN PATENT DOCUMENTS

| | | | |
|---|---|---|---|
| CN | 1943530 | A  * | 4/2007 |
| EP | 1 064 900 | A1 | 1/2001 |
| EP | 2 353 809 | A1 | 8/2011 |
| JP | 2009 167672 | A | 7/2009 |
| MX | PA03 005 457 | A | 1/2005 |

\* cited by examiner

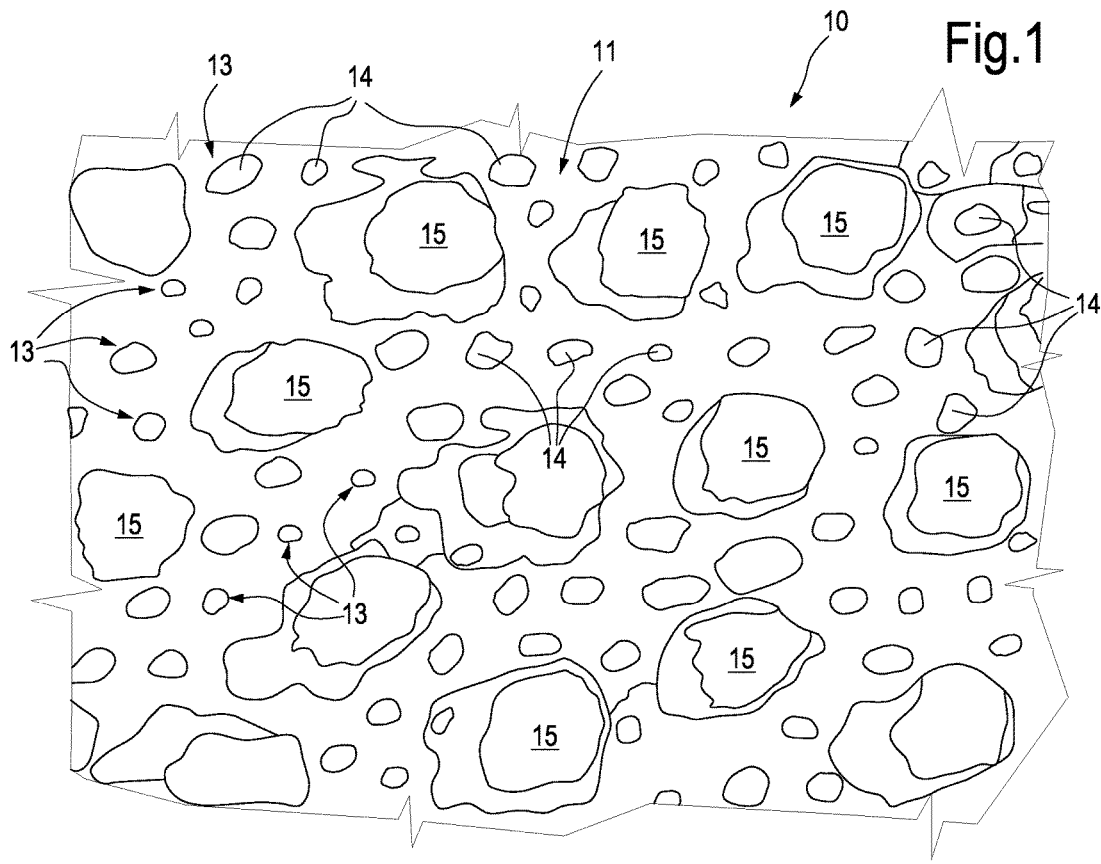
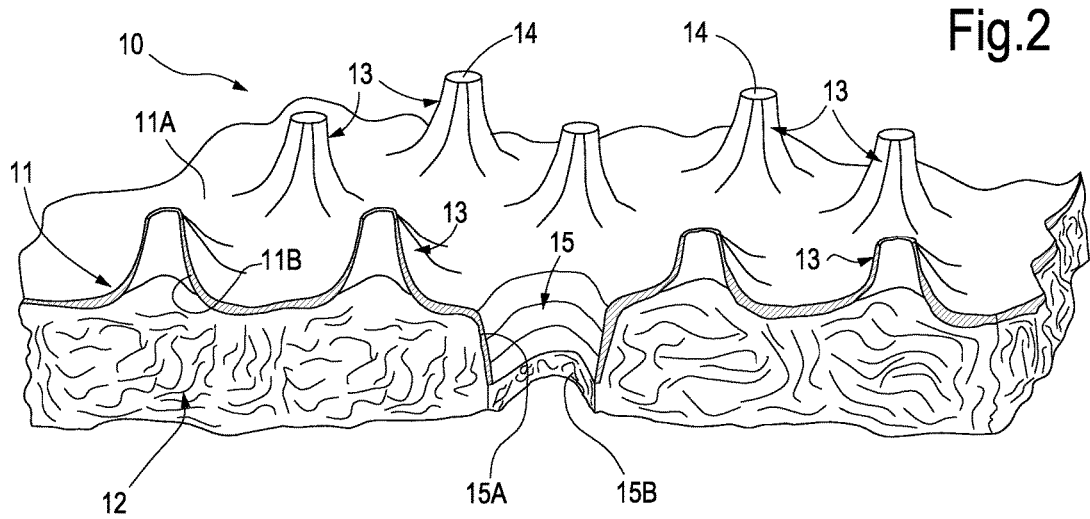

PERFORATED LAMINATED PRODUCT AND METHOD FOR PRODUCING THIS PRODUCT

TECHNICAL FIELD

The present invention relates to flexible laminated sheets or, more in general, products, which comprise films mechanically bonded to nonwoven fabrics, perforated to enable the passage and absorption of fluids, for example to be used in products for intimate hygiene, sanitary products, etc., such as male and female sanitary napkins, diapers for infants and for incontinence, bandages, handkerchiefs, nursing pads, disposable cloths and the like.

More in particular, the subject matter of the present invention is a perforated laminated sheet or product, which comprises an extruded film of microperforated plastic material mechanically joined to a nonwoven fabric that has high "handle" properties, i.e. softness or smoothness to the touch.

The present invention also relates to a method for producing a perforated laminated sheet or product, which comprises an extruded film of microperforated plastic material joined to a nonwoven fabric.

STATE OF THE ART

For some time now, the market of products related to intimate hygiene and, more in general, of sanitary products, such as sanitary napkins, diapers, bandages, handkerchiefs, disposable cloths, etc. has been demanding very high technical and "sensorial" performance.

In fact, this type of product is often required to have high capacity for fluids to pass through and, at the same time, ensure adequate absorption of these fluids, without leaving a feeling of dampness.

Moreover, another fundamental aspect is linked to the need to ensure that this product is pleasant to the touch for the user at the interface between product and area in contact with the user.

At the same time, these products must ensure adequate robustness during use, while maintaining a particularly non "invasive" and light appearance.

To date, the products existing on the market are unable to fully satisfy all these requirements at the same time and, in particular, are unable to simultaneously ensure adequate softness to the touch and adequate permeation of fluids.

From the point of view of production, the technologies that can be used to manufacture these products are many, at times apparently equivalent to one another For example, there are many ways of joining layers of different materials and of producing holes in these materials. However, the large number of procedures with which these methods can be joined to one another give results that can vary even greatly and which are somewhat unsatisfactory.

OBJECT AND SUMMARY OF THE INVENTION

The object of the present invention is to produce a perforated laminated sheet or product, which comprises an extruded film of microperforated plastic material mechanically joined to a nonwoven fabric, with a high "handle", or softness to the touch, and which enables adequate passage of fluids through its thickness.

Another important object of the present invention is to produce a perforated laminated product, which comprises an extruded film of microperforated plastic material mechanically joined to a nonwoven fabric, which is strong and stable, while having low basis weights.

A further important object of the present invention is to produce a perforated laminated product, which comprises an extruded film of microperforated plastic material mechanically joined to a nonwoven fabric, which ensures adequate absorption thereof without leaving a feeling of dampness.

Yet another important object of the present invention is to provide a method for producing a perforated laminated sheet or product, which comprises an extruded film of microperforated plastic material joined to a nonwoven fabric, having a high "handle", or softness to the touch that enables adequate passage of fluids through its thickness, and high strength and stability with low basis weights.

One more important object of the present invention is that of providing a method for producing a perforated laminated sheet or product, which comprises an extruded film of microperforated plastic material joined to a nonwoven fabric, which is economical.

These and other objects, which will be more apparent below, are achieved with a laminated product according to the subsequent claim 1 and with a method according to the subsequent claim 19.

According to a first aspect, the invention therefore relates to a laminated product that comprises a film, preferably extruded, of microperforated plastic material preferably perforated with a vacuum perforation process having protuberances extending in a same direction from a same face of said film, with first holes having an average diameter (for example measured in normal conditions) between 100 micron and 300 micron, more preferably between 170 micron and 240 micron and even more preferably between 185 micron and 226 micron, produced on the vertices of said protuberances, and a layer of nonwoven fabric mechanically joined by lamination to said film on the opposite face to that on which said protuberances extend, said laminated product being perforated with second through holes having an average diameter between 350 micron and 700 micron and more preferably between 470 and 600 micron.

According to another aspect, the invention also relates to a method for manufacturing a laminated product formed by an extruded film of plastic material provided with protuberances that extend from one face thereof with microholes having an average diameter between 100 micron and 300 micron, more preferably between 170 micron and 240 micron and even more preferably between 185 micron and 226 micron, produced on the vertices of said protuberances, and by a layer of nonwoven fabric; this method comprises lamination and simultaneous through perforation, in a calendar provided with a first rotating cylinder with a smooth surface and a second rotating cylinder provided with cusps on the surface, of said film arranged with the protuberances facing said second cylinder, and of said layer of nonwoven fabric facing said first cylinder; lamination takes place with a peripheral speed of said second cylinder greater than the peripheral speed of said first cylinder, so that there is slippage between the two surfaces of said cylinders that causes said perforation to produce through holes with an average diameter between 350 micron and 700 micron and more preferably between 470 micron and 600 micron.

The term "microhole" or "microperforated" in the present text is intended as a hole of small dimensions, for example approximately between 100 micron and 300 micron.

BRIEF DESCRIPTION OF THE DRAWINGS

Further characteristics and advantages of the invention will become more apparent from the following description of a preferred but non-exclusive embodiment thereof, illustrated by way of non-limiting example in the accompanying drawings, wherein:

FIG. 1 represents a top view of a cropped photograph relating to the portion of laminated sheet or product according to the invention;

FIG. 2 represents a schematic transverse cross-sectional view of a portion of product as in FIG. 1;

DETAILED DESCRIPTION OF AN EMBODIMENT OF THE INVENTION

Figure 3:
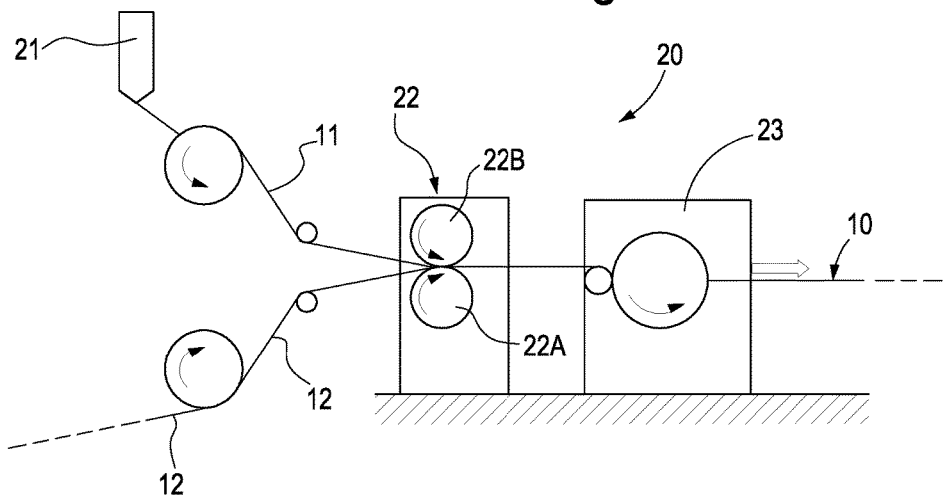
FIG. 3 represents a diagram of a system for implementing a method for producing a product according to the invention.
Figure 4:
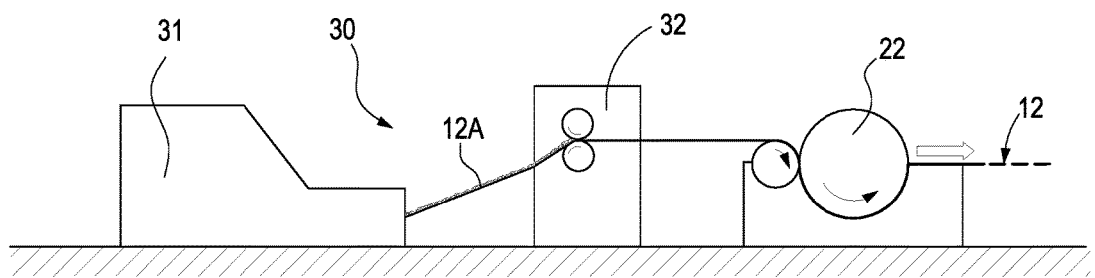
FIG. 4 represents a diagram of a portion of a system for implementing a method for producing a product according to the invention.

With reference to the aforesaid FIGS. 1 and 2, a portion of laminated product according to the invention is indicated as a whole with the number 10.

This laminated product 10 substantially comprises two layers, a first layer formed by a film 11, of plastic material, microperforated, and a second layer formed by a nonwoven fabric 12 mechanically joined to the film (i.e. without the use of an interface of adhesive type), by lamination, as will be better explained below.

More in particular, the film 11 has an array or plurality of protuberances 13 that extend from a face 11A thereof, in a manner on average orthogonal to this face, each of which has a respective first hole 14 at the vertex thereof. In practice, these protuberances are small tubes that protrude from the face 11A and place this face in fluid communication with the other face 11B. For example, these protuberances are truncated-cone shaped, i.e. are convergent channels; in this sense, truncated-cone shaped can also be intended as a geometric shape that is not necessarily precise, but in which it is possible to identify both a base and a vertex having a curved shape (in plan view), for example similar to a circular, ellipsoidal hole, etc., and in which the area of the base is greater than the area of the vertex.

The average thickness of the film 11, measured between the vertices of the protuberances and the second face 11B, is preferably between 200 micron and 440 micron and more preferably between 280 micron and 360 micron. The average thickness of the film 11 in the spaces between the protuberances (excluding the protuberances) is preferably between 5 micron and 20 micron and more preferably between 8 and 12.5 micron.

The measurements of the thicknesses and of the average diameters are taken in normal condition example 20° C. and 1 atm.

These holes 14 are produced with vacuum perforation technology, of known type, better explained below, which enables extension of the perforated protuberances to be obtained.

As known, this perforation technology enables different shapes of protuberances and of holes to be obtained, which can therefore have circular, polygonal, star-shaped, curvilinear sections, etc.

The dimensions of these first holes 14 have an average diameter between 100 microns and 300 microns and more preferably between 180 microns and 230 microns. Considering the deforming effects of the step for forming the appendages and of the subsequent lamination step, diameter is intended as the value of the average diameter of the hypothetical circle having the same area as the hole (for example, the "open area" of a certain portion of product, i.e. the total area of the "voids" on the product, the holes are measured by means of an optical system and then, by counting the number of holes/cm$^2$, the average area of each hole and consequently the average diameter is obtained).

The surface density of first holes 14 is preferably between 300 holes/cm$^2$ and 600 holes/cm$^2$, and more preferably between 400 holes/cm$^2$ and 500 holes/cm$^2$.

The plastic materials that can form the film are for example based on Polyethylene (PE), and more preferably chosen from the following: linear low density polyethylene (LLDPE), metallocene linear low density polyethylene (mLLDPE), low density polyethylene (LDPE), high density polyethylene (HDPE). The layer of nonwoven fabric is produced, for example, with fibers or filaments that preferably comprise one or more of the following materials: polypropylene (PP), polyethylene (PE), polethylene terephthalate (PET), polylactic acid (PLA). Naturally, other plastic materials can also be used.

Advantageously, the layer of nonwoven fabric has hydrophobic properties or is treated to have hydrophobic properties (i.e. the fibers or filaments have these properties) much to the advantage of preventing return of the absorbed fluid toward the surface of the film 11, much to the advantage of feeling dry and masking stains on the product.

In other embodiments the layer of nonwoven fabric or the fibers or filaments thereof can be hydrophilic or have other properties, according to the product requirements.

For example the fibers or filaments are of the type with two components (for example PP/PE, PET/PE) or with one component (PP, PLA etc.). Naturally, other plastic materials could also be used.

Preferably, the nonwoven fabric is made of carded fibers made integral with one another in the passage through a calendar. Otherwise, the layer of nonwoven fabric can be produced using spunbonded technique, i.e. produced with continuous filaments made integral with passage through a calendar, or even with spunlace technique, in which the fibers are bonded by means of jets of water.

This layer of nonwoven fabric is mechanically joined by lamination to the face 11B of the film 11, i.e. the face opposite the one from which the protuberances 13 extend.

The laminated sheet or product 10 has second holes 15 passing through the whole thickness of the product. These holes are produced during the lamination step that joins film and layer of nonwoven fabric and have larger dimensions than the first holes 14. Preferably, these second holes 15 have an average diameter between 350 microns and 700 microns and more preferably between 470 microns and 600 microns. Also in this case the diameter indicated is the value of the average diameter of the hypothetical circle that has the same area as the hole (for example, the open area of a certain portion of product, i.e. the total area of the voids on the product, the holes is measured by means of an optical system and then, counting the number holes/cm$^2$, the average area of each hole and therefore the average diameter is obtained).

Advantageously, the number of said second holes is between 30 and 70 per cm$^2$, preferably between 45 and 55, and more preferably approximately equal to 50.

The second holes are produced during the lamination step and substantially each comprise a "collar" 15A that extends from the second face 11B of the film 11 and is inserted in the thickness of the layer of nonwoven fabric. This collar 15A preferably does not pass through the whole of the thickness of the layer of nonwoven fabric but finishes slightly before this, leaving a small band 15B of nonwoven fabric to define the end mouth of the hole. This collar enables integration and union between film 11 and layer of nonwoven fabric 12 to be increased, acting also as adhesion point of the film on the nonwoven fabric and vice versa. Moreover, it enables the quality and the speed of passage of the fluids through the product to be improved, also producing a conveyor for the fluids.

The average thickness of the layer of nonwoven fabric 12 is preferably between 70 micron and 400 micron, and more preferably between 100 micron and 220 micron and measured in the spaces between the second holes 15, while the weight of this layer is between 6 gsm and 18 gsm. The layer preferably also has a linear fiber density between 1 and 3 denier.

In total, the average thickness of the laminated sheet or product 10, per surface unit, is preferably between 300 micron and 700 micron and more preferably between 400 micron and 550 micron. Advantageously, the weight of this laminated product is preferably between 15 gsm and 40 gsm and more preferably between 18 and 30 gsm.

The ratio between average thickness of the layer of nonwoven fabric 12 (measured in the spaces between the second holes 15) and the average thickness of the film 11 (measured in the spaces between the protuberances, excluding the protuberances) is preferably between 9 and 25 and more preferably between 12.5 and 17.6.

Besides enabling optimal passage of the fluids through the product, the second holes 15 combined with the first holes 14 make it possible to give the structure of the product a less "rigid" consistency.

The structure of the laminated sheet or product thus described has a high "handle" or softness to the touch.

The protuberances, which are in contact with the user's skin, enable the total contact surface to be reduced, much to the advantage of feeling dry and reducing the feeling of "stickiness".

A standardized method of measuring the sensorial quality of the softness of the face 11A of the laminated product with the protuberances, and the related measurement obtained in relation to the product 10, are proposed below by way of example.

The measurement method consists in the tactile sensory evaluation of the softness (or smoothness) also defined as "Softness Panel Test". To prevent visual contact, the method selected was a closed box, into which the panelists can insert their hands to implement the tactile tests on the product, thereby detecting the sensorial properties, in this case softness. For the softness criterion a range of values from 1 to 5 was indicated (1 rough 5 very soft/smooth) for each panelist to attribute to the product evaluated.

The test samples are prepared by fixing identical portions of laminated sheet or product 10 to identical backings, preferably related to the type of final product for which the laminated product is intended, in the current case a sanitary napkin (in the case in hand the topsheet was removed from the sanitary napkin and replaced with the product being tested. Naturally, all the test samples must be produced in the same way, using the same structure and size.

The number of samples is the same as the number of panelists (preferably at least ten).

Before starting the test, the interviewer numbers the samples and decides the order for comparison.

One at a time, the samples are touched by the panelists, who will give their evaluation.

The values defined by the panelists are registered on a sheet indicated below, together with any observations made by the interviewer regarding the method with which the sample was tested.

At the end of the test, the data obtained are processed statistically (mean, standard deviation, coefficient of variation) and the product specification is attributed.

The rough data obtained from the test of two different products are indicated below: a first product "A" according to the example described above and according to the process specifications indicated later in the invention, and a different second product "B" that has the same purposes of use, having a similar structure at the interface part with the user, i.e. a film of microperforated plastic material with protuberances provided with microholes.

TABLE 1

Softness Panel Test Results
(1 rough-5 very soft/smooth)

| Panelist | Evaluation Sample A | Evaluation Sample B |
|---|---|---|
| 1 | 5 | 4 |
| 2 | 4 | 2 |
| 3 | 5 | 1 |
| 4 | 4 | 2 |
| 5 | 5 | 3 |
| 6 | 3 | 2.5 |
| 7 | 4 | 3 |
| 8 | 4 | 1 |
| 9 | 4 | 2 |
| 10 | 4 | 3 |
| 11 | 4 | 3 |
| mean | 4.2 | 2.4 |

From the data indicated it can be noted, regardless of the comparison to sample B, how sample A of the product according to the invention, produced with the method according to the invention was given very high values of softness/smoothness. The particular structure of the product is able to prevent the fluid absorbed from returning to the surface, improving the dry feeling and thus masking any stains caused by body fluids, such as urine, or stains caused by the female menstrual cycle. This effect is enhanced, for example, by the use of a nonwoven fabric made of hydrophobic material.

FIG. 3 shows a system 20 that implements a method for producing a product as described above, composed of apparatus and devices of known type, combined in an original manner.

There is provided an apparatus 21 for extrusion and vacuum perforation of the film 11. The film is produced with a flat head extrusion process and comes into contact with a rotating cylindrical "perforated mesh". The mesh rubs on a groove for the whole of its width, through which a strong vacuum is created.

When the strip of extruded product, still in molten state (i.e. soft, or not yet solidified), i.e. the precursor of the film (i.e. film in molten state), comes into contact with the mesh and passes over the groove, holes are formed in the film at the openings of the mesh due to the vacuum.

Vacuum perforation can also use different processes to the one described above. The shape of the protuberances and soft effect resulting from the use of vacuum perforation is optimal.

In other embodiments, the film can be microperforated by a technique using needles or jets of water, of known type.

The film is produced continuously and moved continuously, i.e. in the same line, towards a perforation and lamination calendar 22. In other embodiments, the film 11 can be produced not in line with the calendar 22, or can be produced separately, by extrusion and vacuum perforation and subsequently suitably wound in a reel (for example by means of a "slit-winder") and then used unwound continuously at the entrance to the calendar 22.

The average thickness of the film 11, before entering the calendar 22, i.e. before being joined to the layer of nonwoven fabric 12, is preferably between 200 micron and 440 micron and more preferably between 280 micron and 360 micron, measured between the vertices of the protuberances 13 and the second face 11B, while in the spaces between the protuberances 13 (excluding the protuberances) it is preferably between 5 micron and 20 micron and more preferably between 8 micron and 12.5 micron.

Simultaneously, the layer of nonwoven fabric 12 is moved continuously by a reel in which it is stored. For example, the layer of nonwoven fabric can be produced on an apparatus 30 (see FIG. 3) that comprises a carding machine 31 that produces an unconsolidated layer of fibers 12A, which subsequently passes continuously through a consolidating calendar 32 that consolidates the layer of fibers to produce the layer of nonwoven fabric, which can subsequently be cut to size in a slit-winder 33 to produce the final layer 12, which is then wound in a reel. In other embodiments the layer of nonwoven fabric can be produced and moved continuously toward the perforating calendar 22 without being wound in a reel, i.e. the forming apparatus of the layer of nonwoven fabric can be in line with the calendar 22.

The average thickness of the layer of nonwoven fabric 12, before entering the calendar 22, i.e. before being joined to the film 11, is preferably between 70 micron and 400 micron, and more preferably between 100 micron and 220 micron, measured in the spaces between the second holes 15; the layer preferably also has a linear fiber density between 1 and 3 denier. The layer of nonwoven fabric has a weight preferably between 6 gsm and 18 gsm.

Film 11 and layer of nonwoven fabric 12 enter the calendar 22 together, for example with the film 11 superimposed on the layer 12, in the same machine direction.

The calendar 22 is provided with a first rotating cylinder 22A with a smooth surface and a second rotating cylinder 22B, provided with a plurality of cusps on the surface (not shown in the figures).

The film 11 enters the calendar 22 so as to be arranged between the layer of nonwoven fabric and the second rotating cylinder 22B. Consequently, the layer of nonwoven fabric 12 enters the calendar 22 so as to be arranged between film 11 and first smooth cylinder 22A. Moreover, the film 11 enters the calendar 22 so that its protuberances 13 are facing the second cylinder 22B.

The two cylinders 22A and 22B rotate in opposite directions (as in any calendar) but with different peripheral speeds, and in particular the peripheral speed of the second cylinder 22B is greater than the peripheral speed of the first cylinder 22A, so that there is slippage between the two surfaces of the cylinders that causes the perforation to produce the second through holes 15 with average diameter as described above.

Preferably, between the two cylinders there is a lamination pressure between 90 and 250 N/mm, and more preferably between 120 and 170.

Therefore, the film 11 and the layer of nonwoven fabric 12, passing through the calendar are made integral with each other, simultaneously producing holes that pass through both, producing a laminate with the structure described above.

Preferably, the film 11 reaches the calendar "cold", i.e. with a temperature between 10° C. and 45° C. Cooling of the film from the extrusion and perforation apparatus 21 to the calendar can take place in air or with the use of cooling means, such as cooling rollers (they are wound on cold rollers), jets of air, etc. (list cooling means). Having the extrusion and perforation of the film 11 in line with the calendar 22 is particularly advantageous, as it enables the temperature of the film entering to be suitably and accurately controlled.

Advantageously, the surface temperature of the second cylinder 22B is preferably between 70° C. and 220° C.

In combination with these temperatures, the surface temperature of the first cylinder 22A is preferably between 75° C. and 240° C.

With regard to the shape of the cusps, this can vary greatly, and for example can be truncated-cone shaped. Preferably, the vertices of these cusps are flat. Truncated-cone shaped is intended as a geometric shape that is not necessarily precise, but in which it is possible to identify both a base and a vertex having a curved shape (in plan view), for example similar to a circular, ellipsoidal hole, etc., and in which the area of the base is greater than the area of the vertex.

Advantageously, the number of cusps per surface unit ($cm^2$) is between 30 a 70 per $cm^2$, more preferably between 45 and 55, and even more preferably approximately around 50.

Once the product has been laminated and perforated in the calendar, it can be wound in a reel, for example by means of a "slit-winder" 23.

From the viewpoint of production, the method for producing the laminate is able to obtain a microperforated product, which preserves the microholes (naturally where no macroholes are present) during the process, produces well-defined through perforations and at the same time enables a layer of nonwoven fabric to adhere to the film, maintaining softness and giving the laminate properties of strength, lightness and stability.

This result cannot be obtained with prior art methods, as it is not possible to obtain products with such high softness, absorption and masking properties by joining two components mechanically. Conventionally, glues are used, increasing the costs, stiffening the product and decreasing the fluid acquisition properties.

It is understood that the drawing only shows possible non-limiting embodiments of the invention, which can vary in forms and arrangements without however departing from the scope of the concept on which the invention is based. Any reference numerals in the appended claims are provided purely to facilitate the reading thereof, in the light of the above description and accompanying drawings, and do not in any way limit the scope of protection.

The invention claimed is:

1. A laminated product comprising:
a film of microperforated plastic material having protuberances extending in a same direction from a same face of said film, with first holes having an average diameter between 100 microns and 300 microns, produced at vertices of said protuberances, each of said protuberances comprising an outer surface adapted to contact a surface of a user of the laminated product; and
a layer of nonwoven fabric joined by lamination to said film on an opposite face to that on which said protuberances extend, said laminated product being perforated with second through holes having an average diameter between 350 microns and 700 microns.

2. A laminated product according to claim 1, wherein a total average thickness of said laminated product is between 300 microns and 700 microns.

3. A laminated product according to claim 2, wherein said film is mechanically joined to said layer of nonwoven fabric, wherein a total average thickness of said film mechanically joined to said layer of nonwoven fabric is between 200 microns and 440 microns.

4. A laminated product according to claim 3, wherein a number of said second through holes is between 30 and 70 holes/cm$^2$.

5. A laminated product according to claim 3, wherein a surface density of said first holes is between 300 holes/cm$^2$ and 600 holes/cm$^2$.

6. A laminated product according to claim 3, wherein an average thickness of said film in spaces without said protuberances and said second through holes is between 5 microns and 20 microns.

7. A laminated product according to claim 3, wherein said film of plastic material is made of one or more of polyethylene (PE), linear low density polyethylene (LLDPE), metallocene linear low density polyethylene (mLLDPE), low density polyethylene (LDPE) and high density polyethylene (HDPE).

8. A laminated product according to claim 3, wherein an average thickness of said nonwoven fabric in spaces without said second through holes is between 70 microns and 400 microns.

9. A laminated product according to claim 3, wherein a weight of said laminated product is between 18 gsm and 25 gsm.

10. A laminated product according to claim 3, wherein said layer of nonwoven fabric has a weight between 15 gsm and 40 gsm.

11. A laminated product according to claim 3, wherein said layer of nonwoven fabric has a linear fiber density between 1 and 3 denier.

12. A laminated product according to claim 3, wherein said layer of nonwoven fabric is produced with fibers or filaments comprising one or more of polypropylene, polyethylene, polyethylene terephthalate and linear polyethylene.

13. A laminated product according to claim 3, wherein said layer of nonwoven fabric is produced with fibers having hydrophobic properties or treated to have hydrophobic properties.

14. A laminated product according to claim 3, wherein said protuberances are approximately truncated-cone shaped.

15. A laminated product according to claim 3, wherein said layer of nonwoven fabric has a positive variation in thickness between an area surrounding edges of said second holes and said protuberances, wherein said thickness increases toward said protuberances.

16. A laminated product according to claim 3, wherein said second holes are produced through simultaneous action of lamination and perforation of the film-layer of nonwoven fabric laminate.

17. A laminated product according to claim 3, wherein said film of microperforated plastic material is extruded and microperforated when the extrusion is still in a molten or soft state.

18. A laminated product according to claim 3, wherein said film of microperforated plastic material is microperforated by vacuum perforation.

19. A laminated product according to claim 3, wherein only said film of microperforated plastic material defines said protuberances.

20. A laminated product according to claim 19, wherein each of said protuberances is open on one side and closed on another side via said layer nonwoven fabric.

21. A laminated product according to claim 19, wherein each of said protuberances extends in a direction away from said layer of nonwoven fabric.

22. A laminated product according to claim 19, wherein each of said protuberances is located at a spaced location from said layer of nonwoven fabric.

23. A laminated product comprising:
 a film of microperforated plastic material having protuberances extending in a same direction from a same face of said film, with first holes having an average diameter between 100 microns and 300 microns, produced at vertices of said protuberances, said film of microperforated plastic material comprising a collar; and
 a layer of nonwoven fabric joined by lamination to said film on an opposite face of said film to that on which said protuberances extend, said laminated product being perforated with second through holes having an average diameter between 350 microns and 700 microns, each of said collars extending from the opposite face of said film, said collar being inserted in a thickness of said layer of nonwoven fabric, said collar defining at least a portion of one of said second through holes.

24. A laminated product according to claim 23, wherein each of said protuberances comprises an outer surface configured to contact a surface of a user of the laminated product.

25. A laminated product according to claim 23, wherein said layer of nonwoven fabric comprises a plurality of nonwoven fabric through holes, each of said nonwoven fabric through holes being located in an area of one of said through holes, said collar being located adjacent to a portion of said layer of nonwoven fabric, said portion of said layer of nonwoven fabric defining a portion of one of said nonwoven fabric through holes, wherein said portion of said layer of nonwoven fabric is free of said film of microperforated plastic material.

26. A laminated product comprising:
 a film of microperforated plastic material comprising a user contact side adapted to contact a user of the laminated product and a nonwoven contact side, said user contact side comprising an outer surface, said outer surface defining a plurality of protuberances extending in a same direction, a plurality of plastic material holes and a plurality of plastic material through holes, each of said plurality of plastic material through holes being located at a spaced location from said plurality of plastic material holes, each of said protuberances comprising a user contact surface for contacting the user of the laminated product, wherein a portion of the outer surface extends between one of the protuberances and another one of the protuberances, the user contact surface defining one of said plastic material holes on one side of a respective protuberance, each of said plurality of plastic material holes comprising a plastic material hole diameter, each of said plurality of plastic material through holes comprising a through hole diameter, said through hole diameter being greater than said plastic material hole diameter; and a layer of nonwoven fabric comprising an outer nonwoven fabric surface and a plastic material contact surface located opposite said outer nonwoven fabric surface, said plastic material contact surface being joined by lamination to said nonwoven contact side of said film, each of said protuberances being closed on another side thereof via said layer of nonwoven fabric, said user contact surface being located at a first distance from said outer nonwoven fabric surface, said portion of said outer surface being located at a second distance from said outer nonwoven fabric surface, said second distance being greater than said first distance.

27. A laminated product according to claim 26, wherein said plurality of plastic material holes are produced at vertices of said protuberances, said plastic material hole diameter being between 100 microns and 300 microns, said through hole diameter being between 350 microns and 700 microns.

28. A laminated product according to claim 27, wherein a number of said through holes is between 30 and 70 holes/cm' and a total average thickness of said laminated product is between 300 microns and 700 microns.

29. A laminated product according to claim 27, wherein each of said protuberances extends in a direction away from said layer of nonwoven fabric, each of said protuberances comprising a protuberance outer surface, said protuberance outer surface being located at a spaced location from said layer of nonwoven fabric.

30. A laminated product according to claim 27, wherein said outer surface comprises a plurality of collar portions, each of said collar portions comprising a collar outer surface and an inner collar surface, said outer collar surface defining at least a portion of one of said plurality of through holes, said inner collar surface being in direct contact with said plastic material contact surface of said layer of nonwoven fabric, said layer of nonwoven fabric comprising a plurality of nonwoven fabric through holes, each of said nonwoven fabric through holes being located in an area of one of said plastic material through holes, wherein a portion of said layer of nonwoven fabric is located adjacent to one of said collars, said portion of said layer of nonwoven fabric defining a portion of one of said nonwoven fabric through holes, wherein said portion of said layer of nonwoven fabric is not covered by said film of microperforated plastic material.

* * * * *